(12) United States Patent
Jaumann et al.

(10) Patent No.: US 10,558,109 B2
(45) Date of Patent: Feb. 11, 2020

(54) TRIPOD HEAD

(71) Applicant: Vitec Videocom GmbH, Eching (DE)

(72) Inventors: Leonhard Jaumann, Munich (DE); Thomas Wehrmann, Munich (DE)

(73) Assignee: VITEC VIDEOCOM GMBH (DE)

( * ) Notice: Subject to any disclaimer, the term of this patent is extended or adjusted under 35 U.S.C. 154(b) by 0 days.

(21) Appl. No.: 15/244,889

(22) Filed: Aug. 23, 2016

(65) Prior Publication Data

US 2016/0357093 A1     Dec. 8, 2016

Related U.S. Application Data

(63) Continuation of application No. 13/368,996, filed on Feb. 8, 2012, now Pat. No. 9,506,519.

(30) Foreign Application Priority Data

Feb. 11, 2011  (DE) ........................ 20 2011 002 608

(51) Int. Cl.
   *G03B 17/56*      (2006.01)
   *F16F 15/121*     (2006.01)
   (Continued)

(52) U.S. Cl.
   CPC ............. *G03B 17/561* (2013.01); *F16F 9/12* (2013.01); *F16F 13/00* (2013.01);
   (Continued)

(58) Field of Classification Search
   CPC ...... F16F 9/145; F16F 9/12; F16F 9/14; F16F 9/34; F16F 9/20; F16F 15/16; F16F 9/125;
   (Continued)

(56) References Cited

U.S. PATENT DOCUMENTS

| 1,238,447 A | 8/1917 | Severy |
| 1,829,376 A * | 10/1931 | Stead ........................ F16F 7/06 188/130 |

(Continued)

FOREIGN PATENT DOCUMENTS

| CN | 1141670 A | 1/1997 |
| DE | 1937011 | 1/1970 |

(Continued)

OTHER PUBLICATIONS

Chinese Examination Report for CN Patent Application No. 201210029702.3 with Search Report dated Jan. 14, 2015.
German Examination Report for DE 20 2011 002 608.6.

*Primary Examiner* — Jonathan Liu
*Assistant Examiner* — Taylor L Morris
(74) *Attorney, Agent, or Firm* — Gable Gotwals; Scott R. Zingerman

(57) ABSTRACT

A tripod head, in particular to hold a film or television camera, includes a first body and a second body, wherein the first body can be pivoted about at least one pivot axis relative to the second body, and a damping device to damp the pivoting movement of the first body relative to the second body, with a first damping element fixed to the first body and a second damping element, wherein the damping elements each have a plurality of concentrically arranged annular ribs which engage in cavities formed between the ribs of the respective other damping element and a damping medium is provided between the ribs of the damping element, wherein the second damping element is formed of at least two separate parts which are fixable independently of each other to the second body.

11 Claims, 3 Drawing Sheets

(51) Int. Cl.

| | | |
|---|---|---|
| *F16M 11/16* | (2006.01) | |
| *F16M 11/06* | (2006.01) | |
| *F16F 9/12* | (2006.01) | |
| *F16M 11/04* | (2006.01) | |
| *F16F 13/00* | (2006.01) | |
| *F16F 9/30* | (2006.01) | |
| *F16F 7/06* | (2006.01) | |
| *F16F 15/16* | (2006.01) | |
| *F16M 11/32* | (2006.01) | |
| *F16M 11/02* | (2006.01) | |
| *F16M 13/04* | (2006.01) | |
| *F16M 11/10* | (2006.01) | |
| *F16M 11/08* | (2006.01) | |

(52) U.S. Cl.
CPC ....... *F16F 15/1215* (2013.01); *F16M 11/041* (2013.01); *F16M 11/06* (2013.01); *F16M 11/16* (2013.01); *F16F 7/06* (2013.01); *F16F 9/30* (2013.01); *F16F 15/16* (2013.01); *F16M 11/02* (2013.01); *F16M 11/04* (2013.01); *F16M 11/08* (2013.01); *F16M 11/10* (2013.01); *F16M 11/32* (2013.01); *F16M 13/04* (2013.01); *F16M 2200/041* (2013.01); *F16M 2200/047* (2013.01)

(58) Field of Classification Search
CPC ...... F16F 9/00; F16F 9/103; F16F 9/53; F16F 7/02; F16F 7/04; F16F 7/06; E05Y 2201/266; E05Y 2201/256; E05Y 2201/254; B62K 21/08; B60T 10/02; B60G 2202/22; E05F 5/00; E05F 3/14; F16D 57/04; F16D 57/00; F16D 25/063; F16D 25/061; F16D 25/062; F16D 21/06; F16M 11/32; F16M 11/10; F16M 11/041; F16M 13/04; F16M 11/08; F16M 11/06; F16M 11/024; F16M 11/043; F16M 11/14; F16M 11/2007; F16M 11/24; G03B 17/56
USPC ......... 248/177.1, 178.1, 179.1, 180.1, 181.1, 248/181.2, 187.1, 176.3, 186.1, 186.2, 248/636; 396/419, 421, 428; 188/290; 192/48.613, 55.4, 66.31, 66.32, 70.27, 192/89.2, 113.25
See application file for complete search history.

(56) References Cited

U.S. PATENT DOCUMENTS

| | | | | |
|---|---|---|---|---|
| 3,305,808 A | * | 2/1967 | Widl | ............ H01F 7/1623 335/243 |
| 3,317,166 A | * | 5/1967 | Janssen | ............ F16F 15/02 248/604 |
| 3,362,510 A | | 1/1968 | Nash | |
| 3,462,136 A | * | 8/1969 | Rumsey | ............ F16F 1/326 267/136 |
| 3,464,233 A | * | 9/1969 | Brouwers | ............ F16D 3/14 464/101 |
| 3,552,699 A | | 1/1971 | Baker | |
| 3,667,877 A | * | 6/1972 | Lamm | ............ F01C 19/04 418/121 |
| 4,226,303 A | | 10/1980 | Thoma | |
| 4,247,069 A | | 1/1981 | Kurz | |
| 4,703,958 A | * | 11/1987 | Fremy | ............ F16L 37/0841 251/149.6 |
| 4,704,879 A | * | 11/1987 | Christ | ............ B02C 17/18 384/99 |
| 4,734,080 A | * | 3/1988 | Kronert | ............ F16D 3/80 464/26 |
| 4,759,534 A | * | 7/1988 | Hartel | ............ F16F 13/30 188/267.1 |
| 4,899,854 A | | 2/1990 | Cartoni | |
| 5,310,382 A | * | 5/1994 | Guimbretiere | ............ F16D 35/005 192/103 R |
| 5,553,834 A | * | 9/1996 | Je | ............ F16C 27/04 188/307 |
| 5,593,012 A | * | 1/1997 | Aho | ............ F16D 35/00 192/30 W |
| 5,605,208 A | * | 2/1997 | Friedrichsen | ............ F16F 7/04 188/130 |
| 6,176,783 B1 | * | 1/2001 | Lindsay | ............ F16F 9/12 188/290 |
| 6,230,450 B1 | * | 5/2001 | Kuroda | ............ E04H 9/02 188/322.5 |
| 6,675,944 B2 | * | 1/2004 | Lee | ............ F16D 25/12 192/106 F |
| 6,729,448 B2 | * | 5/2004 | Takahashi | ............ E05F 5/003 188/290 |
| 6,945,209 B2 | * | 9/2005 | Franke | ............ F16F 15/1457 123/192.1 |
| 7,494,290 B2 | | 2/2009 | Kim | |
| 7,600,624 B2 | * | 10/2009 | Mori | ............ F16D 21/06 192/48.613 |
| 7,878,465 B2 | | 2/2011 | Jaumann et al. | |
| 8,104,290 B2 | * | 1/2012 | Ellis | ............ F23R 3/60 267/158 |
| 2002/0162712 A1 | * | 11/2002 | Kauhaniemi | ...... H04M 1/0237 188/266 |
| 2004/0045398 A1 | * | 3/2004 | Hayashi | ............ B60R 7/06 74/573.1 |
| 2008/0258022 A1 | | 10/2008 | Jaumann et al. | |
| 2010/0259671 A1 | | 10/2010 | Lindsay et al. | |
| 2011/0025862 A1 | * | 2/2011 | Lindsay | ............ F16M 11/10 348/208.5 |
| 2011/0061984 A1 | * | 3/2011 | Grosspietsch | ............ F16D 13/52 192/70.11 |
| 2011/0139565 A1 | * | 6/2011 | Acker | ............ F16D 21/06 192/48.601 |

FOREIGN PATENT DOCUMENTS

| | | | |
|---|---|---|---|
| DE | 2457267 A1 | 6/1976 | |
| DE | 2657692 C2 | 6/1978 | |
| DE | 3833944 A1 | 12/1989 | |
| DE | 102007018029 B3 | 9/2008 | |
| EP | 0527620 A2 | 2/1993 | |
| WO | WO 2009105861 A1 * | 9/2009 | ......... F16D 13/683 |

* cited by examiner

Section A-A

Section B-B

TRIPOD HEAD

This application claims the benefit of German Application No. DE 20 2011 002 608.6 filed Feb. 11, 2011, and is a continuation of co-pending U.S. application Ser. No. 13/368,996 filed on Feb. 8, 2012, herein incorporated by reference in its entirety for all purposes.

The present invention concerns a tripod head and in particular a tripod head suitable for holding a film and television camera. In particular, the present invention concerns a damping device for damping the pivoting movement of a first body of the tripod head relative to a second body of the tripod head, and in particular a hydraulic damping device.

Such a hydraulic damping device is known for example from DE 26 57 692 A1. This damping device comprises several damping members each composed of a first and a second damping element. The damping elements are constructed out of several ring and spacer discs arranged alternately and connected together. The ring discs of the first damping element engage comb-like between the ring discs of the second damping element. Between the respective ring discs a damping medium such as silicone oil is provided. The several damping members can be switched separately via a hand control in order to adjust the damping force. The particular disadvantage with this design, however, is the large amount of material used to form the individual damping members and their complex mounting, which leads to high production costs. A further disadvantage is that the respective damping members are fixed via toothing, wherein a toothing activated via a hand control engages in the toothing of the respective damping member. To achieve play-free damping it is therefore necessary to produce all the damping members with small tolerances. This too leads to high production costs.

In addition, for the damping force to be adjustable, many damping members are required arranged in succession in the axial direction, which requires substantial axial construction space.

Furthermore, DE 38 33 944 A1, which forms the basis for the preamble of claim 1, discloses a damping device for a tripod head which is constructed of fewer parts and is therefore easier to install. The disadvantage of this embodiment, however, is that the damping force is not adjustable.

One possibility of adjusting the damping force in a damping device as described in DE 38 33 944 A1 is known from WO 95/10728 A1. There the first and the second damping elements are moved relative to each other in the axial direction to set the desired damping force. The concentrically arranged annular ribs are moved comb-like into and out of each other, wherein the damping force falls when the ribs are moved out and rises when they are moved together. However, this embodiment has a comparatively complex structure and also requires substantial construction space in the axial direction due to the movement of the damping elements. Furthermore, on moving the damping elements in relation to each other there is a risk that due to the different creep behaviour of the damping medium, the setting of the damping force will not be sustained reproducibly e.g. after some pivoting movements. A further disadvantage is that the damping elements cannot be moved completely away from each other and thus it is not possible to set a zero damping force.

In view of these designs, the object of the present invention is to create a tripod head with a hydraulic damping device which can be manufactured with little material usage and simple installation, requires little construction space and also allows adjustment of the damping force.

This object is achieved by a tripod head with the features of claim 1. Advantageous refinements of the invention are given in the sub-claims.

The basic principle of the present invention is that (only) one of the damping elements which intermesh in the manner of a comb is made of multiple parts and that the parts are arranged next to each other in the radial direction. As the parts can be fixed separately, the damping force is adjustable. However, almost no extra space is required in the axial direction as the parts lie next to each other in the radial direction. In addition the parts of the one damping element engage in the same opposing damping element so that only one part (in total three parts) is required.

Accordingly, a tripod head according to the present invention has a first and a second body, wherein the first body can be pivoted about at least one axis relative to the second body. Such tripod heads usually allow pivoting of the mounted film and television camera about at least two axes, a horizontal and a vertical axis. Such tripod heads are usually constructed from a base body for fixing to the tripod, an intermediate body and a holder to fasten the film and television camera. The intermediate body is pivotable about a vertical axis relative to the base body and the holder is pivotable about a horizontal axis relative to the intermediate body. The damping device according to the invention can be used for damping the pivoting movement about the horizontal and/or vertical axis. The damping device can consequently damp the pivoting movement of the intermediate body relative to the base body or the pivoting movement of the holder relative to the intermediate body. The damping device according to the invention serves to damp the pivoting movement in order to guide a camera evenly and under control. The damping device comprises a first and a second damping element. The first damping element is fixed to the first body while the second damping element, as will be explained below, can be fixed optionally to the second body in order to activate the damping device and set the damping force. The two damping elements each have several annular ribs arranged concentric to the pivot axis which engage in the cavities formed between the ribs of the other damping element. Between the ribs of the damping element is provided a damping medium or fluid e.g. a damping liquid e.g. silicone oil or grease. According to the invention, the second damping element is constructed from at least two separate parts which are not connected together. The two parts each have several annular ribs arranged concentrically which engage in the cavities formed between the ribs of the first damping element. These at least two parts of the second damping element can be fixed independently of each other to the second body in order thus to set the damping force. Thus for example with two parts, four damping stages can be achieved. If neither of the two parts of the second damping element is fixed to the second body, no damping occurs (stage 0). If just one part is fixed to the second body, there is a first damping force (stage 1). If just the second part is fixed to the second body and the damping force provided by the two parts differs, there is a third damping force (stage 2). If finally both parts are fixed to the second body, the maximum damping force is provided (stage 3). If the second damping element is formed from more than two parts, there is the possibility of integrating even further damping stages. As the ribs of the two separate parts of the second damping element engage in the cavities of the ribs of the same first damping element and the parts are arranged radially next to each other or concentric to each other, the damping force becomes adjustable without an increase in the necessary construction space in the axial direction. In addition the damping device essentially comprises just three parts and is therefore simple to assemble and can be manufactured with little material use.

Advantageously, the two separate parts are fixed in that the separate parts of the second damping element each have at least one recess into which at least one engagement element can catch. It can be advantageous here for each of the separate parts to have several recesses in each of which at least one engagement element can catch. As a result, a high torque transfer can be guaranteed from the second body to the respective part.

It is particularly preferred if the engagement elements can catch in the recesses in the axial direction. As the concentric arrangement of the two separate parts of the second damping element already requires more construction space in the radial direction, a movement of the engagement elements in the axial direction into the recesses can avoid a further increase in construction space in the radial direction. It is, however, also conceivable for the engagement elements to be able to move or catch in the respective recesses in the radial direction. Here for example systems such as described in DE 10 2007 018 029 A1 can be used.

According to a preferred embodiment, the engagement elements are pre-tensioned in the direction of the recesses. In other words they are forced into engagement with the recesses e.g. by a spring. It is however equally conceivable to pretension or force the engagement elements in the opposing direction i.e. out of engagement with the recesses.

According to this embodiment, it is particularly preferred to design the engagement elements as a one-piece constituent of a leaf spring. As a result the pretension or forcing of the engagement elements can be achieved by one and the same element which also forms the engagement elements and is preferably formed as a bent and stamped part. Consequently this embodiment constitutes a solution which is easy to produce with few parts. The leaf spring serves to pretension the engagement elements in the direction of the recesses or in the opposite direction.

For this the engagement elements are preferably bent out of the plane of the leaf spring into an upright position. To guarantee an adequate torque transfer, it is preferred if the engagement elements are formed as flat tabs so that a relatively large contact surface can be created between the engagement elements and the walls of the separate parts limiting the recesses.

In addition when toothing was used to fix the damping elements concerned in the prior art it was necessary to maintain low tolerances in the production process in order to guarantee play-free damping (see introduction). In order to design the production process more favourably in this regard, it is advantageous to form the engagement elements from two tabs preferably spaced in the peripheral direction of the separate parts of the second damping element and sloping in opposing directions, which preferably are designed sprung against their direction of slope. This embodiment allows the engagement elements themselves to compensate for mounting and production tolerances when catching in the recesses so that larger tolerances can be permitted in mounting and production.

To facilitate use of the tripod head, it is preferred to provide a hand control which the user can operate to fix the two separate parts optionally to the second body. The hand control can be a rotary knob or a turning ring as described for example in DE 26 57 692 A1, which cooperates with a spring-loaded press pin and presses the engagement elements out of or into engagement with the recesses of the separate parts. Also hand controls as disclosed in DE 10 2007 018 029 can be used.

To reduce the number of parts necessary for mounting, it is particularly preferred if the first damping element and/or the parts of the second damping element are each manufactured from one piece, in particular in a primary forming process, in particular an injection moulding process. This avoids the need to assemble the actual damping elements and for mounting, the damping elements need merely be guided into each other and fastened to the tripod head.

To improve this further, it is particularly preferred if parts of the second damping element are formed as concentric rings which each have a base plate from which the concentric ribs extend. To facilitate mounting further, the base plate of one ring has a dimension which extends over or overlaps or protrudes beyond the base plate of the other ring on assembly. As a result, the overlapping part of the base plate of the ring, which comes into broad surface contact with the base plate of the other ring, can retain this. Advantageously the ring lying radially on the inside has a base plate protruding beyond the base plate of the ring lying radially further out.

Further advantages and features of the present invention which can be implemented alone or in combination with one or more of the above features, where they do not contradict these features, are evident from the description below of a preferred embodiment of the present invention. This refers to the enclosed drawings in which.

Figure 1:
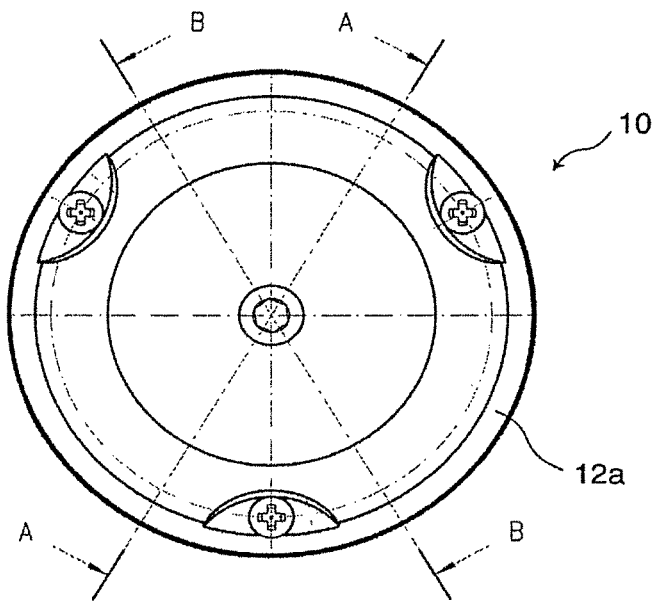
FIG. 1 shows a top view of a base body of a tripod head according to one embodiment of the present invention.
Figure 2:
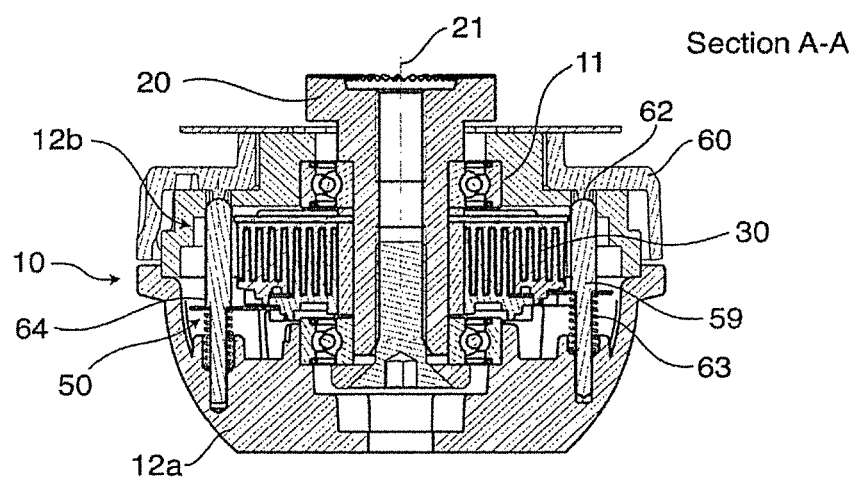
FIG. 2 shows a section through the press pin along line A-A in FIG. 1.
Figure 3:
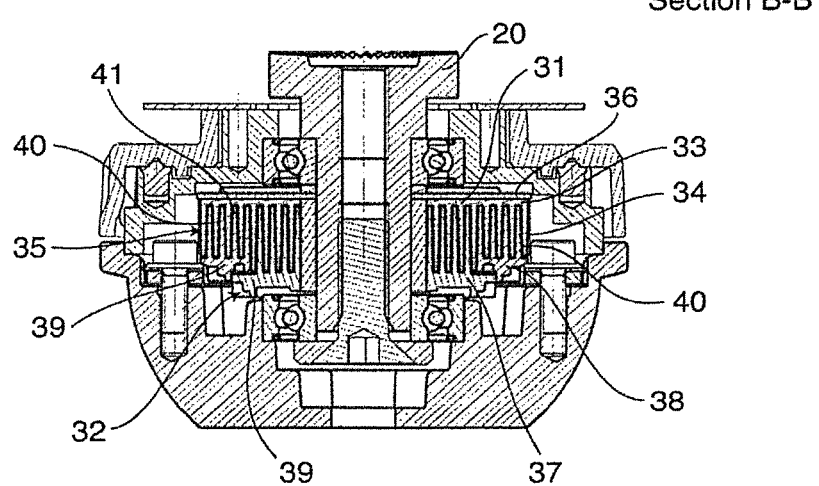
FIG. 3 shows a section through the fixing of the leaf springs along line B-B in FIG. 1.

FIG. 1 shows an underside view of part of a tripod head according to the present invention. A base body (second body) is shown in FIGS. 2 and 3, and a shaft 20 (first body) which is mounted rotatably via bearings 11 in the base body 10 and connected with an intermediate body not shown of the tripod head. The shaft 20 can pivot about the pivot axis 21 relative to the base body 10 which is usually fixed to a tripod. The base body 10 in the embodiment shown consists of two housing halves 12a, 12b.

To be able to damp the pivoting movement of the shaft 20 relative to the base body 10, a damping device 30 is provided. The damping device substantially comprises a first damping element 31 and a second damping element 32.

The first damping element 31 has an annular base plate 33 arranged concentric to the pivot axis 21. From this base plate 33, several concentrically arranged annular ribs 34 extend in the axial direction (in the direction of the pivot axis 21). Between every two adjacent annular ribs 34 is formed a cavity 35 (see FIG. 5). The first damping element 31 is rotatably fixed (attached) to the shaft 20 so that it rotates with the shaft 20. For this an annular metal plate 36 can be used which is connected with the base plate 33. This can be connected rotationally stationary with shaft 20 via toothing. Alternatively it is also conceivable to press the metal plate 36 via its centre opening onto the shaft 20. Advantageously the metal plate 36 together with the first damping element 31 is one moulding produced in a primary forming method as part of an injection moulding process.

A second damping element 32 is made of two parts 37 and 38. The two parts 37, 38 of the second damping element 32 are arranged rotatable relative to shaft 20. The two parts 37 and 38, like the first damping element 31, are each formed from a base plate 39 shaped as a ring arranged concentric to pivot axis 21. Several annular ribs 40 arranged concentric to pivot axis 21 extend from this base plate 39, running in the axial direction (in the direction of the pivot axis 21). Between adjacent ribs 40 in each case is formed a cavity 41, as in the first damping element 31 (see FIG. 3). Both parts 37, 38, like the first damping element 31, are produced in a primary forming process in particular in an injection moulding method and are therefore made of one piece. In mounted state and as evident from FIGS. 2 and 3, the concentric ribs 40 of the two parts 37, 38 of the second damping element 32 engage in the cavities 35 between the ribs 34 of the first damping element 31 and the ribs 34 of the first damping element 31 engage in the cavities 41 between the ribs 40 of the two parts 37, 38 of the second damping element 32. In other words the ribs 40 and 34 of the first and second damping elements 31 and 32 intermesh like a comb.

Between the respective ribs 34 and 40 is provided a damping medium e.g. silicone oil or silicone grease.

Figure 4:
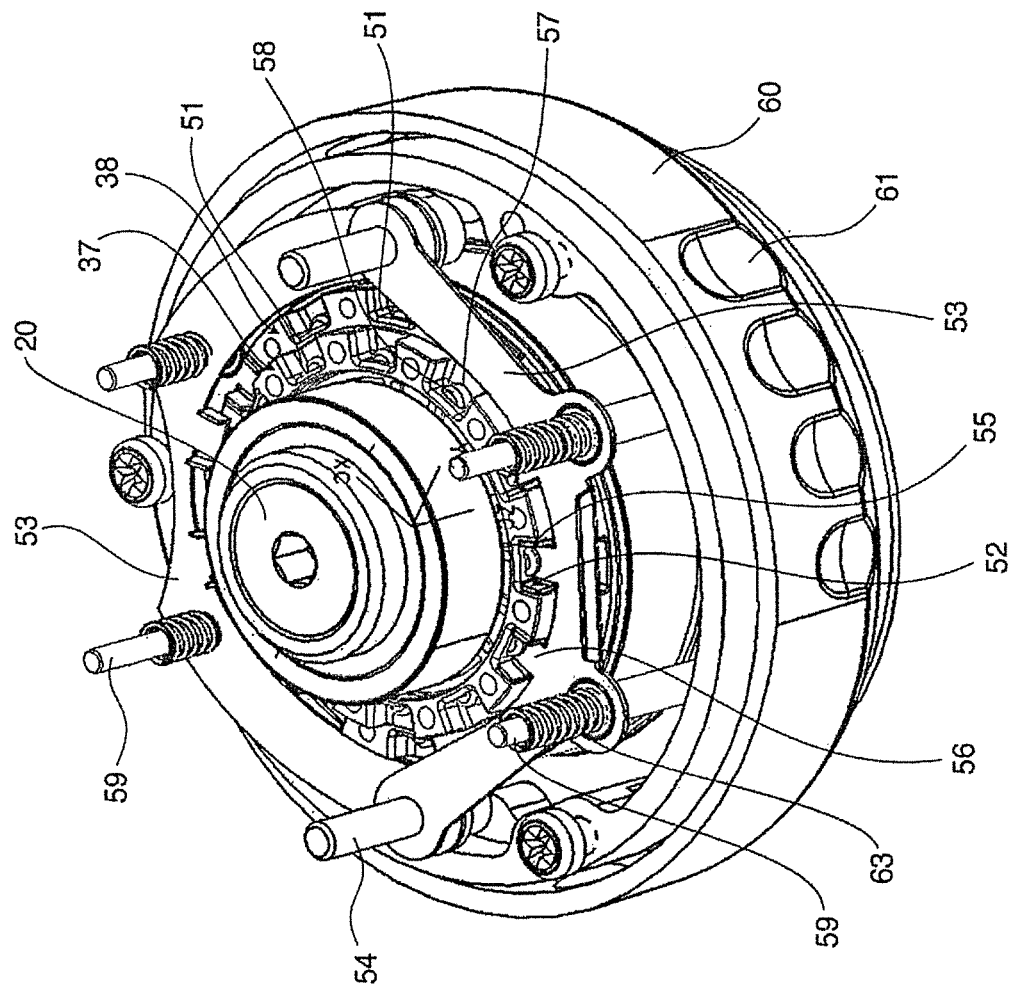
FIG. 4 shows a perspective view of the base body from FIGS. 1 to 3 with housing cover removed.
Figure 5:
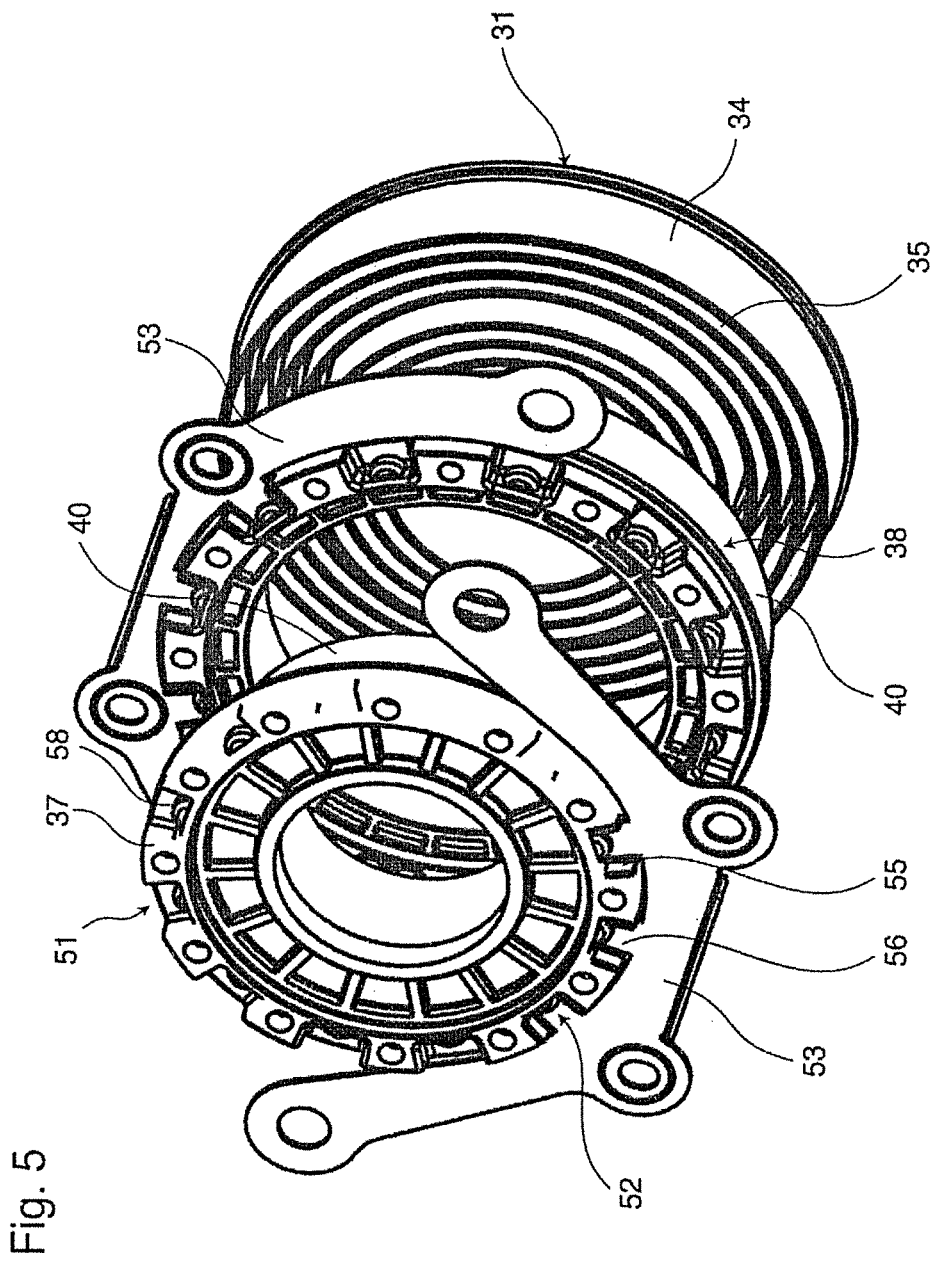
FIG. 5 shows an exploded view of the damping device from FIGS. 1 to 4.

The two parts 37, 38 can be fixed independently of each other to the base body 10. For this a fixing mechanism 50 is provided. As is best seen in FIGS. 4 and 5, the two parts 37 and 38 have several recesses 51. These are preferably evenly distributed about the periphery of parts 37, 38. Furthermore a leaf spring 53 is allocated to each part 37, 38. The leaf springs 53 are arranged parallel to each other and fixed via their respective ends to the base body 10 via screw connections 54. Advantageously the leaf springs 53 extend such that their respective ends can be fixed via the same screw connection 54.

The leaf springs 53 preferably have at least one engagement element 52 (here three engagement elements 52). In the embodiment shown these are flat tabs 55 bent out of the plane of the leaf springs 53. Each engagement element 52 here comprises two tabs 55 spaced in the peripheral direction of parts 37, 38. These slope away from each other in opposite directions and consequently are designed sprung in the direction opposite their slope. Tabs 55 are joined together and with the leaf spring 53 by a web 56. In the web 56 a recess 57 can be provided into which a protrusion 58 provided inside the recesses 51 can engage. Recesses 57 are preferably in the form of a part circle, as are the protrusions 58. The leaf spring with the engagement element 52 is preferably a stamped and bent part.

The leaf springs 53 are designed resilient or sprung in (only) the axial direction (in the direction of pivot axis 21). To be able to move the leaf springs 53 between a position fixing the respective part 37 or 38 into a position releasing the respective part 37, 38 and vice versa, one or more press pins 59 are provided which are mobile in the axial direction inside the base body 10.

To be able to move the press pins 59, a hand control 60 is provided which is rotatably mounted on the base body 10. In the embodiment shown this is formed as a turning ring which can be turned manually via finger grooves 61 (see FIG. 4).

The hand control 60 on its side facing the base body 10 has a cam control 62 which is in contact with one end of the press pin 59. In particular the press pins 59 are pretensioned by spring 63 against the cams 62 of the hand control 60. As evident from FIG. 4, two press pins 59 are allocated to each leaf spring 53. The press pins 59 have a shoulder 64 on their side facing the cam control 62 of the hand control 60 in relation to the leaf springs 53, which shoulder on activation of the respective press pin 59 comes to rest (makes contact) with side 53 of the leaf springs facing the parts 37, 38 in order to move the leaf springs 53.

As is best seen from FIGS. 2 and 3, the dimension of the base plate 39 of part 37 in its external dimension is designed larger than the inner diameter of the base plate 39 of the other part 38. As a result the base plate 39 of part 37 overlaps or extends over the base plate 39 of part 38. When the ribs 40 and ribs 34 intermesh comb-like, the base plate 39 of part 37 thus holds part 38 in engagement with the first damping element 31.

The function of the tripod head described above is explained in more detail below.

If the shaft 20 is pivoted relative to the base body 10, the first damping element 31 moves with the shaft 20.

In the state depicted in FIGS. 2 and 3, both parts 37, 38 of the second damping element 32 are fixed relative to the base body 10 so that the first damping element 31 rotates relative to parts 37, 38 of the second damping element 32, and via the damping medium and the engagement of ribs 40 and 34 in the cavities 35 and 41, a damping of the pivoting movement about the pivot axis 21 occurs.

The engagement elements 52 formed of two tabs 55 are thus in engagement with recesses 51 of parts 37 and 38. In particular the faces of tabs 55 pointing outwards in the peripheral direction lie on the faces of recesses 51 pointing inwards in the peripheral direction. The recesses 57 are in engagement with protrusions 58 within the recesses 51. As a result there is a connection between the leaf springs 53 and the respective parts 37, 38. Via the leaf springs 53 fixed to the base body 10 or its housing half 12a via bolts 54 (screw connections) therefore torque is transferred from the parts 37, 38 to the housing half 12a of the base body 10.

To be able to adjust the damping force, parts 37, 38 of the second damping element 32 can be fixed separately to the base body 10. As shown for example in FIG. 4, it is conceivable to fix only the part 37 while the part 38 is free and rotates with the first damping element 31 as it rotates. For this the hand control 60 rotates and the cam control 62 causes a translation movement of the press pins 59 allocated to part 38 in the direction away from the cam control. Here by the contact of the shoulders 34 of the press pins 59 on the leaf spring 53, the leaf spring 53 is pushed up in FIG. 4 or down in FIGS. 2 and 3. The engagement elements 52 allocated to part 38 thus move out of engagement with recesses 51 so that the part 38 can rotate relative to the base body 10 and turns with the rotation of the first damping element 31. The same process takes place when part 37 is released.

If the hand control 60 is moved to a position as shown in FIGS. 2 and 3, the press pins 59 are pressed back because of spring 63 and the leaf spring 53 springs back to its starting position under its spring force. The engagement elements 52 now move into engagement with the respective recesses 51 of the respective part 37, 38 in order to fix this relative to the base body 10.

In the embodiment shown therefore four damping stages can be achieved. A first damping stage 0 in which parts 37, 38 are free (not fixed) and can rotate together with the first damping element 31. In this stage no damping takes place. A damping stage 1 in which element 37 is fixed while element 3B is free. A damping stage 2 in which the first part 37 is free but the second element 38 is fixed, and a damping stage 3 in which both parts 37, 38 are fixed.

The description above of one embodiment refers to a two-part second damping element 32. However, more than two parts are conceivable with correspondingly more damping stages.

In addition, a pretension of the engagement elements 52 in the axial direction was described, i.e. these can be pushed in and out in the axial direction. It is, however, also conceivable to achieve the locking by engagement elements which can be pushed in and out in the radial direction or by rotationally moved engagement elements. Also other activation types than the activation ring are possible as a hand control 60 e.g. rotary knobs with corresponding translation. For example a cam control as described in DE 10 2007 018 029 A1 can be used. It is therefore evident that a multiplicity of derivations and modifications of the embodiment described can be made without deviating from the basic concept of the present invention.

The invention claimed is:

1. A tripod head to hold a film or television camera, comprising:
   a first body;
   a second body, wherein said first body is rotatably mounted in said second body and wherein said first body can be pivoted about at least one pivot axis relative to the second body;
   a first damping element fixed to said first body;
   a second damping element formed of at least two separate parts and an associated leaf spring for each, each leaf spring having a plane and at least one engagement element at least a portion of which extends out of the plane of said leaf spring; each leaf spring capable of independently engaging the at least one engagement element and a respective one of the at least two separate parts to fix said separate part to said second body and alternately disengaging the at least one engagement element from its respective one of the at least two separate parts to release said separate part from said second body; and
   wherein said first damping element and said second damping element engage one another with a damping medium provided between said first damping element and said second damping element.

2. The tripod head according to claim 1 wherein said at least two separate parts of said second damping element each having at least one recess in which said at least one engagement element of said respective leaf spring is capable of catching in order to fix the respective parts to said second body.

3. The tripod head according to claim 2 wherein said at least one engagement elements being pretensioned in or out of engagement with said recesses.

4. The tripod head according to claim 3 wherein said engagement elements are formed by two tabs spaced in the peripheral direction of said at least two separate parts of said second damping element and slope in opposite directions.

5. The tripod head according to claim 4 further including a hand control for fixing said at least two separate parts optionally to said second body.

6. The tripod head according to claim 1 wherein said first damping element is rotatably fixed to said first body.

7. A tripod head to hold a film or television camera, comprising:
   a first body;
   a second body, wherein said first body is rotatably mounted in said second body and wherein said first body can be pivoted about at least one pivot axis relative to the second body;
   a first damping element fixed to said first body;
   a second damping element formed of at least two separate parts and an associated leaf spring for each, each leaf spring including at least one engagement element and adapted for both independently fixing a respective one of the at least two separate parts to said second body and alternately releasing therefrom;
   wherein said at least two separate parts of said second damping element each having at least one recess in which an engagement element of said respective leaf spring is capable of catching in order to fix the respective one of said at least two separate parts of said second damping element to said second body and alternately releasing in order to release the respective one of said at least two separate parts of said second damping element from said second damping body, said engagement elements being one-piece components of said leaf springs; and
   wherein said first damping element and said second damping element engage one another with a damping medium provided between said first damping element and said second damping element.

8. The tripod head according to claim 7 wherein said first damping element and said second damping element each having a plurality of concentrically arranged annular ribs which engage in cavities formed between the ribs of the respective other damping element and wherein said at least two parts of said second damping element are formed as concentric rings each having a base plate from which a plurality of said concentric ribs extend and wherein said concentric ribs of said at least two parts extend in the same direction from their respective base plate;
   said leaf springs being formed by two tabs spaced in the peripheral direction of said at least two separate parts of said second damping element and slope in opposite directions;
   said engagement elements being pretensioned in and out of engagement with said recesses.

9. The tripod head according to claim 8 further including a hand control for fixing said at least two separate parts optionally to said second body.

10. The tripod head according to claim 7 wherein said first damping element is rotatably fixed to said first body.

11. A tripod head to hold a film or television camera, comprising:
   a first body;
   a second body, wherein said first body is rotatably mounted in said second body and wherein said first body can be pivoted about at least one pivot axis relative to the second body;
   a first damping element fixed to said first body;
   a second damping element formed of at least two separate parts and an associated leaf spring for each, each leaf spring capable of independently fixing its respective one of the at least two separate parts to said second body;
   wherein said at least two separate parts of said second damping element each having at least one recess in which an engagement element of said respective leaf spring is capable of catching in order to fix the respective one of said at least two separate parts of said second damping element to said second body, said engagement elements being one-piece components of said leaf springs;
   wherein said first damping element and said second damping element engage one another with a damping medium provided between said first damping element and said second damping element;

wherein said first damping element and said second damping element each having a plurality of concentrically arranged annular ribs which engage in cavities formed between the ribs of the respective other damping element and wherein said at least two parts of said second damping element are formed as concentric rings each having a base plate from which a plurality of said concentric ribs extend and wherein said concentric ribs of said at least two parts extend in the same direction from their respective base plate.

* * * * *